United States Patent
Shin et al.

(10) Patent No.: US 12,125,244 B2
(45) Date of Patent: Oct. 22, 2024

(54) MEASUREMENT AND APPLICATION OF IMAGE COLORFULNESS USING DEEP LEARNING

(71) Applicant: KYOCERA Document Solutions, Inc., Osaka (JP)

(72) Inventors: Kilho Shin, Los Angeles, CA (US); Dongpei Su, Palos Verdes Estates, CA (US)

(73) Assignee: KYOCERA Document Solutions, Inc., Osaka (JP)

( * ) Notice: Subject to any disclaimer, the term of this patent is extended or adjusted under 35 U.S.C. 154(b) by 454 days.

(21) Appl. No.: 17/672,427

(22) Filed: Feb. 15, 2022

(65) Prior Publication Data

US 2023/0260161 A1 Aug. 17, 2023

(51) Int. Cl.
*G06T 7/90* (2017.01)
*G06N 3/04* (2023.01)

(52) U.S. Cl.
CPC .............. *G06T 7/90* (2017.01); *G06N 3/04* (2013.01); *G06T 2207/10024* (2013.01); *G06T 2207/20084* (2013.01)

(58) Field of Classification Search
CPC ............. G06T 7/90; G06T 2207/10024; G06T 2207/20084; G06T 2207/20081; G06N 3/04; G06N 3/048; G06N 3/09; G06N 3/0464
USPC ........................................................ 382/158
See application file for complete search history.

(56) References Cited

U.S. PATENT DOCUMENTS

| | | | |
|---|---|---|---|
| 8,988,452 B2 | 3/2015 | Peng et al. | |
| 9,177,550 B2 * | 11/2015 | Yu | G06N 3/084 |
| 9,830,709 B2 | 11/2017 | Li et al. | |
| 9,965,705 B2 | 5/2018 | Chen et al. | |
| 10,373,312 B2 | 8/2019 | Abedini et al. | |
| 10,402,697 B2 | 9/2019 | Yang et al. | |
| 10,685,262 B2 | 6/2020 | Yao et al. | |
| 10,706,267 B2 | 7/2020 | Wang et al. | |
| 11,023,791 B2 * | 6/2021 | Chang | G06N 3/04 |
| 2017/0308754 A1 | 10/2017 | Torabi et al. | |
| 2018/0260698 A1 | 9/2018 | Lin et al. | |
| 2019/0045160 A1 | 2/2019 | El-Yamany | |
| 2019/0287234 A1 | 9/2019 | Panda et al. | |
| 2020/0210526 A1 | 7/2020 | Leibovitz et al. | |
| 2021/0112261 A1 * | 4/2021 | Hwang | G06T 11/001 |

OTHER PUBLICATIONS

Hasler, D., & Suesstrunk, S. E. (Jun. 2003). Measuring colorfulness in natural images. In Human vision and electronic imaging VIII (vol. 5007, pp. 87-95). International Society for Optics and Photonics.

(Continued)

*Primary Examiner* — Neil R McLean
(74) *Attorney, Agent, or Firm* — Rowan TELS LLC

(57) ABSTRACT

A method includes generating multiple attention map for an image from outputs of a corresponding different one of multiple convolutional hidden layers of a neural network. A different weighted attention map is then generated from each of the attention map. The weighted attention maps are input to a first fully-connected neural network layer to generate a colorfulness metric, which may be used to augment human-perceived colorfulness of the image.

20 Claims, 11 Drawing Sheets

(56) References Cited

OTHER PUBLICATIONS

Jetley, S., Lord, N. A., Lee, N., & Torr, P. H. (2018). Learn to pay attention. arXiv preprint arXiv:1804.02391.
Yendrikhovskij, S. N., Blommaert, F. J., & de Ridder, H. (Jan. 1998). Optimizing color reproduction of natural images. In Color and Imaging Conference (vol. 1998, No. 1, pp. 140-145). Society for Imaging Science and Technology.
Zerman, E., Rana, A., & Smolic, A. (Sep. 2019). Colornet-estimating colorfulness in natural images. In 2019 IEEE International Conference on Image Processing (ICIP) (pp. 3791-3795). IEEE.
Zhao, Z. Q., Zheng, P., Xu, S. T., & Wu, X. (2019). Object detection with deep learning: A review. IEEE transactions on neural networks and learning systems, 30(11), 3212-3232.

\* cited by examiner

MEASUREMENT AND APPLICATION OF IMAGE COLORFULNESS USING DEEP LEARNING

BACKGROUND

Human's have an intrinsic capability to ascertain when one image is more colorful than another. However mimicking the human perception of colorfulness with machine vision systems has proven difficult.

Colorfulness may be defined as an amount of color information that a human observer would perceive in an image. Accurately measuring colorfulness is crucial in many practical applications, such as printer and scanner image reproduction quality, high-dynamic-range tone-mapping, aesthetic image analysis, color reproduction in cameras, and image and video quality assessment. FIG. 1 depicts an example of colorfulness metrics for different images.

Conventional computer vision methods measure colorfulness by calculating the amount of pixel-wise color values of an image, such as saturation or RGB (red-green-blue) channels. However, there has been limited success with these approaches in computer vision because colorfulness judgment is a human subjective and perceptual process.

Recently, deep learning technology has been successfully achieved human-like tasks, such as semantic image segmentation or object saliency detection and therefore increased interest in overcoming the limitations of the conventional computer vision approaches.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
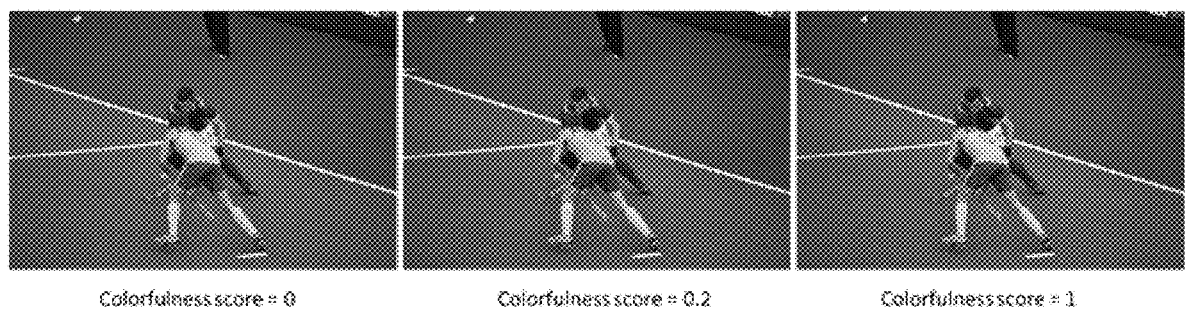
FIG. 1 depicts an example of colorfulness metrics for different images.

The following description may be better understood on conjunction with the following terms. Other terms should be accorded their ordinary meaning in the art unless indicated otherwise by context.

"Algorithm" refers to any set of instructions configured to cause a machine to carry out a particular function or process.

"App" refers to a type of application with limited functionality, most commonly associated with applications executed on mobile devices. Apps tend to have a more limited feature set and simpler user interface than applications as those terms are commonly understood in the art.

"Application" refers to any software that is executed on a device above a level of the operating system. An application will typically be loaded by the operating system for execution and will make function calls to the operating system for lower-level services. An application often has a user interface but this is not always the case. Therefore, the term 'application' includes background processes that execute at a higher level than the operating system.

"Application program interface" refers to instructions implementing entry points and return values to a module.

"Attention estimator" refers to logic that generates attention maps. There are many example of such logic known in the art, e.g., implemented in Keras, Pytorch, TensorFlow etc.

"Attention map" refers to a vector identifying areas of an input for focused processing. Attention maps may be generated by attention layers in neural networks, and are typically two or three dimensional for image or 3D object inputs, respectively. An example attention map for images is a 2D heatmap which indicates needed-to-be-attended locations with respect to the target feature or task. Important locations may be represented by higher values in a heatmap. For example if a "border collie" is the target feature to recognize in images, the attention map for the images will emphasize the position in the original image of objects having features indicating a border collie depiction.

"Computer program" refers to another term for 'application' or 'app'.

"Driver" refers to low-level logic, typically software, that controls components of a device. Drivers often control the interface between an operating system or application and input/output components or peripherals of a device, for example.

"File" refers to a unitary package for storing, retrieving, and communicating data and/or instructions. A file is distinguished from other types of packaging by having associated management metadata utilized by the operating system to identify, characterize, and access the file.

"Global feature map" refers to a map of features for an entire image.

"Instructions" refers to symbols representing commands for execution by a device using a processor, microprocessor, controller, interpreter, or other programmable logic. Broadly, 'instructions' can mean source code, object code, and executable code. 'instructions' herein is also meant to include commands embodied in programmable read-only memories (EPROM) or hard coded into hardware (e.g., 'micro-code') and like implementations wherein the instructions are configured into a machine memory or other hardware component at manufacturing time of a device.

"Intermediate feature map" refers to a feature map generated by a convolutional hidden layer.

"Library" refers to a collection of modules organized such that the functionality of all the modules may be included for use by software using references to the library in source code.

"Local feature map" refers to a map of features in a sub-region (less than full image) of a full image.

"Logic" refers to any set of one or more components configured to implement functionality in a machine. Logic includes machine memories configured with instructions that when executed by a machine processor cause the machine to carry out specified functionality; discrete or integrated circuits configured to carry out the specified functionality; and machine/device/computer storage media configured with instructions that when executed by a machine processor cause the machine to carry out specified functionality. Logic specifically excludes software per se, signal media, and transmission media.

"Module" refers to a computer code section having defined entry and exit points. Examples of modules are any software comprising an application program interface, drivers, libraries, functions, and subroutines.

"Plug-in" refers to software that adds features to an existing computer program without rebuilding (e.g., changing or re-compiling) the computer program. Plug-ins are commonly used for example with Internet browser applications.

"Process" refers to software that is in the process of being executed on a device.

"Programmable device" refers to any logic (including hardware and software logic) who's operational behavior is configurable with instructions.

"Representation of an image" refers to a depiction of the image on a machine display, or on a print medium.

"Service" refers to a process configurable with one or more associated policies for use of the process. Services are commonly invoked on server devices by client devices, usually over a machine communication network such as the Internet. Many instances of a service may execute as different processes, each configured with a different or the same policies, each for a different client.

"Software" refers to logic implemented as instructions for controlling a programmable device or component of a device (e.g., a programmable processor, controller). Software can be source code, object code, executable code, machine language code. Unless otherwise indicated by context, software shall be understood to mean the embodiment of said code in a machine memory or hardware component, including "firmware" and micro-code.

"Subroutine" refers to a module configured to perform one or more calculations or other processes. In some contexts the term 'subroutine' refers to a module that does not return a value to the logic that invokes it, whereas a 'function' returns a value. However herein the term 'subroutine' is used synonymously with 'function'.

"Task" refers to one or more operations that a process performs.

"Weight map" refers to a mapping of weights to values, e.g., to attention values.

"Weighted attention map" refers to an attention map with attention values scaled by corresponding weights from a weight map.

Techniques are disclosed to incorporate attention maps in deep learning models of human-perceived colorfulness. To develop a colorfulness measurement metric that correlates accurately with human perception, a convolutional neural network (CNN) and an attentional map are utilized to generate a rating of colorfulness for a given natural image.

An exemplary application of the disclosed neural network models is an automated colorization photo service. Automated colorization is a technology to generate a color image from a monochrome image.

Convolutional neural networks (CNNs) are particularly well suited to classifying features in data sets modelled in two or three dimensions. This makes CNNs popular for image classification, because images can be represented in computer memories in three dimensions (two dimensions for width and height, and a third dimension for pixel features like color components and intensity). For example a color JEG image of size 480×480 pixels can be modelled in computer memory using an array that is 480×480×3, where each of the values of the third dimension is a red, green, or blue color component intensity for the pixel ranging from 0 to 255. Inputting this array of numbers to a trained CNN will generate outputs that describe the probability of the image being a certain class (0.80 for cat, 0.15 for dog, 0.05 for bird, etc). Image classification is the task of taking an input image and outputting a class (a cat, dog, etc) or a probability of classes that best describes the image.

Fundamentally, CNNs input the data set, pass it through a series of convolutional transformations, nonlinear activation functions (e.g., RELU), and pooling operations (down-sampling, e.g., maxpool), and an output layer (e.g., Softmax) to generate the classifications.

Figure 2:
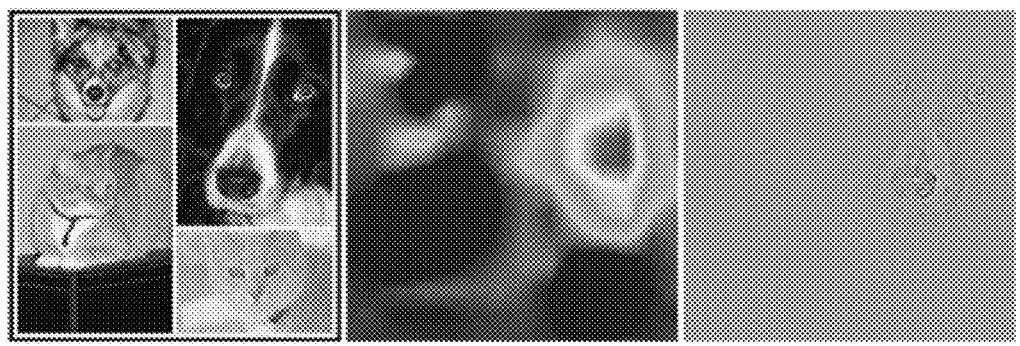
FIG. 2 depicts an example of an attention map, represented as a heat map.

FIG. 2 depicts an example of an attention map for an image collage (left panel), represented as a heat map (middle panel). The attention map comprises values ranging from 0 to 1. In this example, the attention map works as a 'attention boosting map' to emphasize a certain part of the collage as representing a border collie (right panel).

In one aspect, a system includes a plurality of convolutional hidden layers, a first fully-connected layer receiving outputs of a final one of the convolutional hidden layers, a plurality of attention estimators each coupled to receive an output of a corresponding different one of the plurality of the convolutional hidden layers, a plurality of weight maps each configured to be applied to an output of a corresponding different one of the attention estimators, and a second fully-connected layer coupled to receive results of applying each of the weight map.

In the system, each of the attention estimators may receive an intermediate feature map from a corresponding different one of the plurality of the convolutional hidden layers. The plurality of convolutional hidden layers may be implemented in a VGG neural network with a final layer (the first fully-connected layer) providing inputs to the plurality of the attention estimators instead of to a subsequent final fully-connected layer. In other words, the attention estimators intervene between the final fully-connected layers conventionally used as final layers in VGG neural networks. More particularly the convolutional hidden layers may be implemented in a VGG16 neural network.

An output of the second fully-connected layer may be configured as an input to a loss function to update configuration of the convolutional hidden layers. The output of the second fully-connected layer may be configured to act as a control for image colorfulness augmentation logic. Other technical features may be readily apparent to one skilled in the art from the following figures, descriptions, and claims.

Two or more of the convolutional hidden layers may separate the corresponding different ones of the plurality of the convolutional hidden layers that output the intermediate feature maps to the plurality of the attention estimators. Each of the attention estimators may also receive a global feature map from the first fully-connected layer.

In one aspect, a method includes generating a plurality of attention maps for an image from outputs of a corresponding different one of a plurality of convolutional hidden layers of a neural network, generating a plurality of weighted attention maps from the attention maps, applying the weighted attention maps to a first fully-connected neural network layer to generate a colorfulness metric, and applying the colorfulness metric to augment human-perceived colorfulness of the image. Each of the attention maps may be generated from a different intermediate feature map output from a different one of the convolutional hidden layers. Each of the the attention maps is further generated from a global feature map output from a second fully-connected neural network layer. The convolutional hidden layers may be part of a VGG neural network where the second fully-connected neural network layer is a final layer of the VGG neural network.

Other technical features may be readily apparent to one skilled in the art from the following figures, descriptions, and claims.

A determination by the system that an image has below-optimal or desirable colorfulness may trigger a color enhancement/augmentation process on the image, such as gamma correction, contrast stretching, histogram equalization, contrast-limited adaptive histogram equalization (CLAHE), retinex, homomorphic, and wavelet multi-scale techniques to transform the image to a more human-perceived colorfulness. In some embodiments these processes may be carried out by a printer and/or scanner. In other embodiments these processes may be carried out by a television set, a digital camera, and/or a cell phone camera.

A limiting factor for many color enhancement algorithms is the absence of an applicable metric of color information. Many image enhancement algorithms are rely on the luminance properties of an image. For example, contrast stretching and histogram equalization make an image more vivid by enhancing or equalizing the luminance channel of an image; however, these algorithms do not improve the color information itself. Also, RGB or CIE information in an image does not imply a vividness of the image because human color perception is complex and subjective. A relevant and applicable human-perceived colorfulness metric for images enables improvement to many color production processes.

The disclosed techniques provide a measure of an image's vividness similar to a human's subjective color perception. These techniques may be faster, and/or more accurate, and/or more efficient to implement than prior approaches.

Although described with examples involving images, those of ordinary skill in the art will recognize that the techniques disclosed herein are readily extended to colorfulness detection and enhancement/augmentation of digital video (e.g., reference frames for some types of video codecs) as well.

Figure 3:
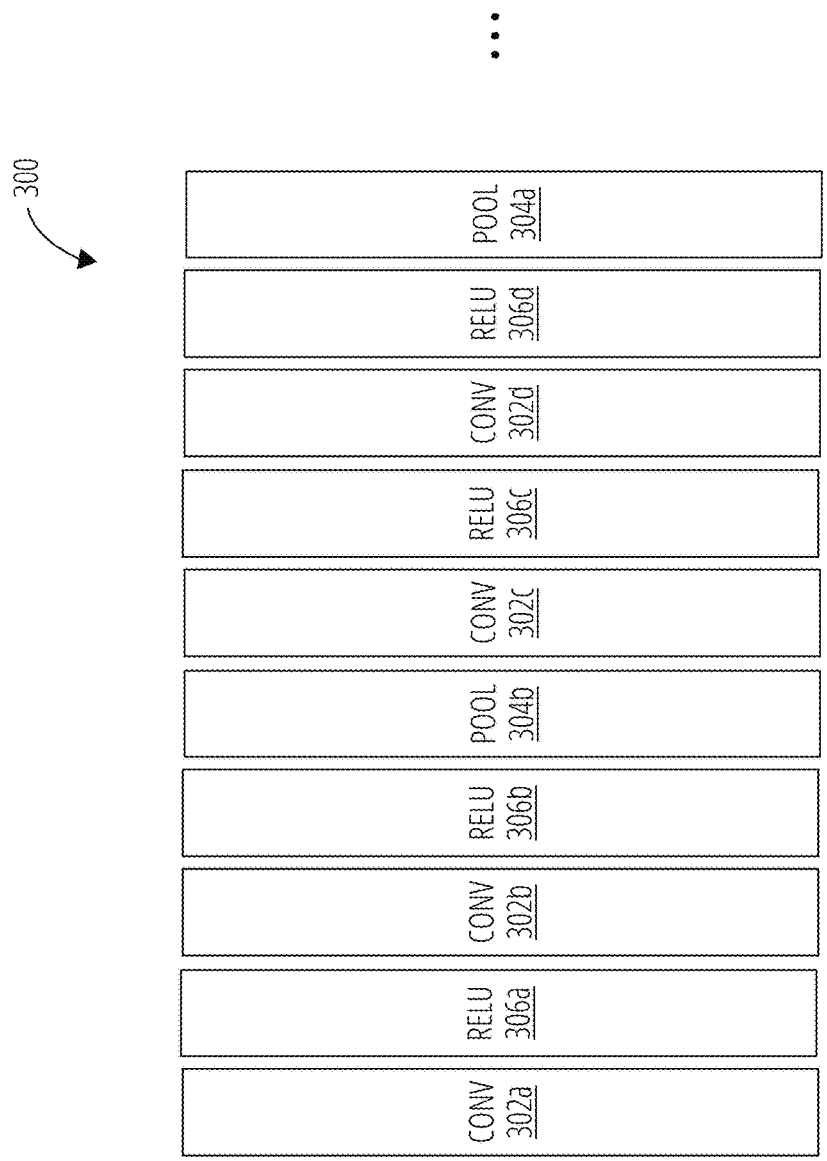
FIG. 3 depicts a VGG net 300 in accordance with one embodiment.

FIG. 3 depicts a form of a CNN known as a VGG net 300. The initial convolution layer 302a stores the raw image pixels and the final pooling layer 304a determines the class scores. Also depicted are the intermediate convolution layers (convolution layer 302b, convolution layer 302c, and convolution layer 302d) and rectifier activations (RELU layer 306a, RELUlayer 306b, RELUlayer 306c, and RELUlayer 306d) and intermediate pooling layers (pooling layer 304b, pooling layer 304a) along the processing path.

The VGG net 300 replaces the (often large) single-layer filters of basic CNNs with multiple smaller-sized (e.g., 3×3) filters in series. With a given receptive field (the effective area size of the input image), multiple stacked smaller-size filters may perform better at image feature classification than a single layer with a larger filter size, because multiple non-linear layers increase the depth of the network which enables it to learn more complex features. In a VGG net 300 each pooling layer may be small, e.g., 2×2.

Figure 4:
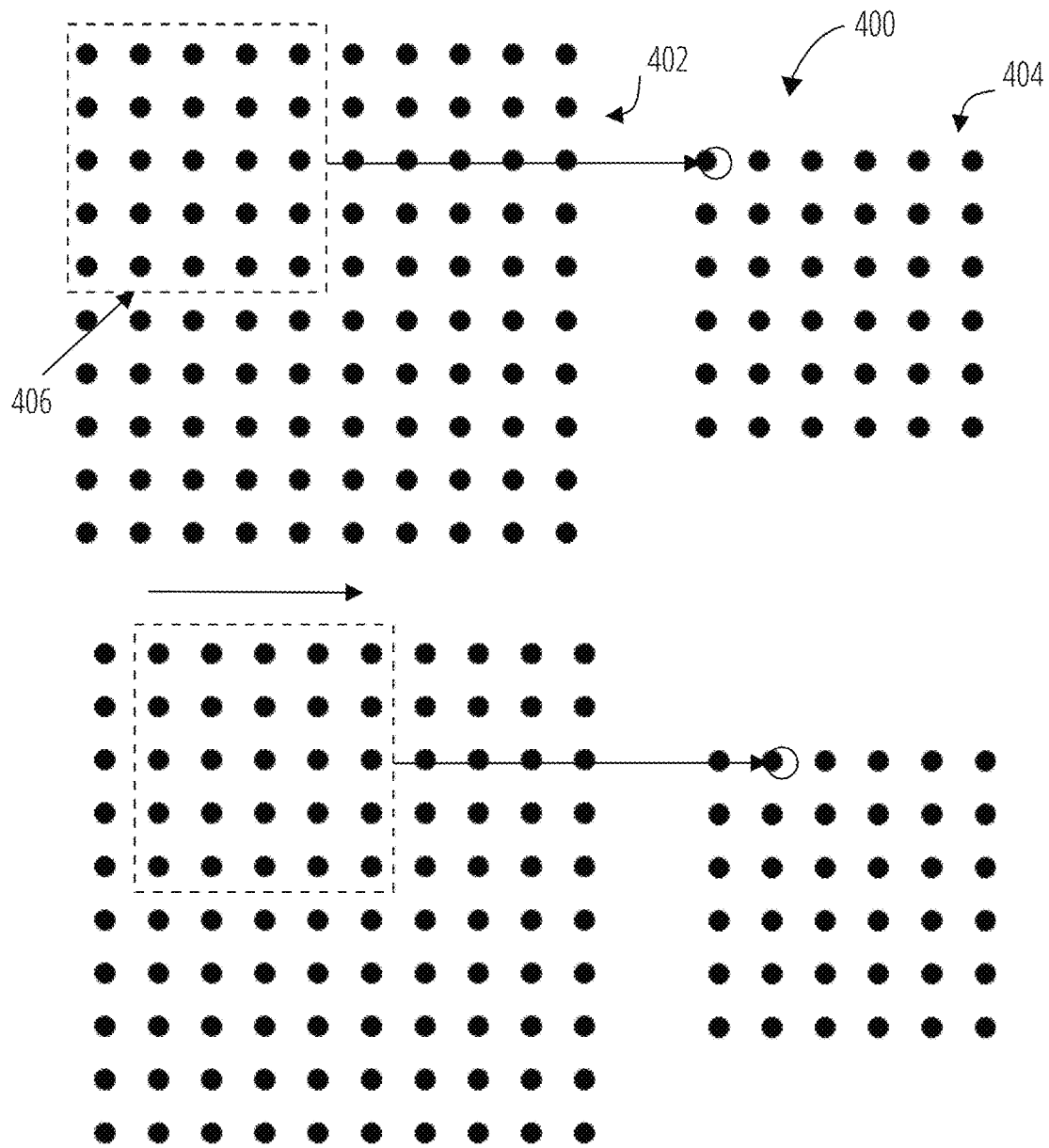
FIG. 4 depicts a convolution layer filtering 400 in accordance with one embodiment.

FIG. 4 depicts convolution layer filtering 400 that couples outputs from groups of neurons in a convolution layer 402 to neurons in a next layer 404. A receptive field is defined for the convolution layer 402, in this example sets of 5×5 neurons. The collective outputs of neurons in the receptive field are weighted and mapped to (typically one) neuron(s) in the next layer 404. This weighted mapping is referred to as the filter 406 for the convolution layer 402, or sometimes referred to as the kernel of the convolution layer 402. The filter 406 depth is not depicted in this example. In other words, the filter 406 may actually comprise a cubic volume of neurons in the convolution layer 402, not a two-dimensional area as depicted. Thus what is depicted may comprise a "slice" of the full filter 406. The filter 406 is "slid", i.e. convolved, across the input image features, each time mapping to a different neuron(s) in the next layer 404. For example FIG. 4 depicts the filter 406 slid to the right by 1 unit (the "stride" length), creating a slightly offset receptive field from the top one, and mapping its output to the next neuron in the next layer 404. The stride may be configured to other values than one (1), with larger strides reducing the overlaps in the receptive fields, and hence further reducing the size of the next layer 404. Unique receptive fields in the convolution layer 402 for the steps map to different neurons in the next layer 404. Thus, if the convolution layer 402 is 32×32×3 neurons per slice, the next layer 404 may comprise 28×28×1 neurons to cover all of the receptive fields of the convolution layer 402. This may be referred to as an activation map or feature map. There is thus achieved a reduction in layer complexity due to the filtering. There are 784 different ways that a 5×5 filter may uniquely map to a 32×32 convolution layer 402, therefore the next layer 404 may be reduced to 784=28×28 neurons. The depth of the convolution layer 402 may also be reduced from three (3) to one (1) in the next layer 404.

The number of total layers to use in a CNN, the number of convolution layers, the filter sizes, and the values for strides at each layer are examples of "hyperparameters" of the CNN.

Figure 5:
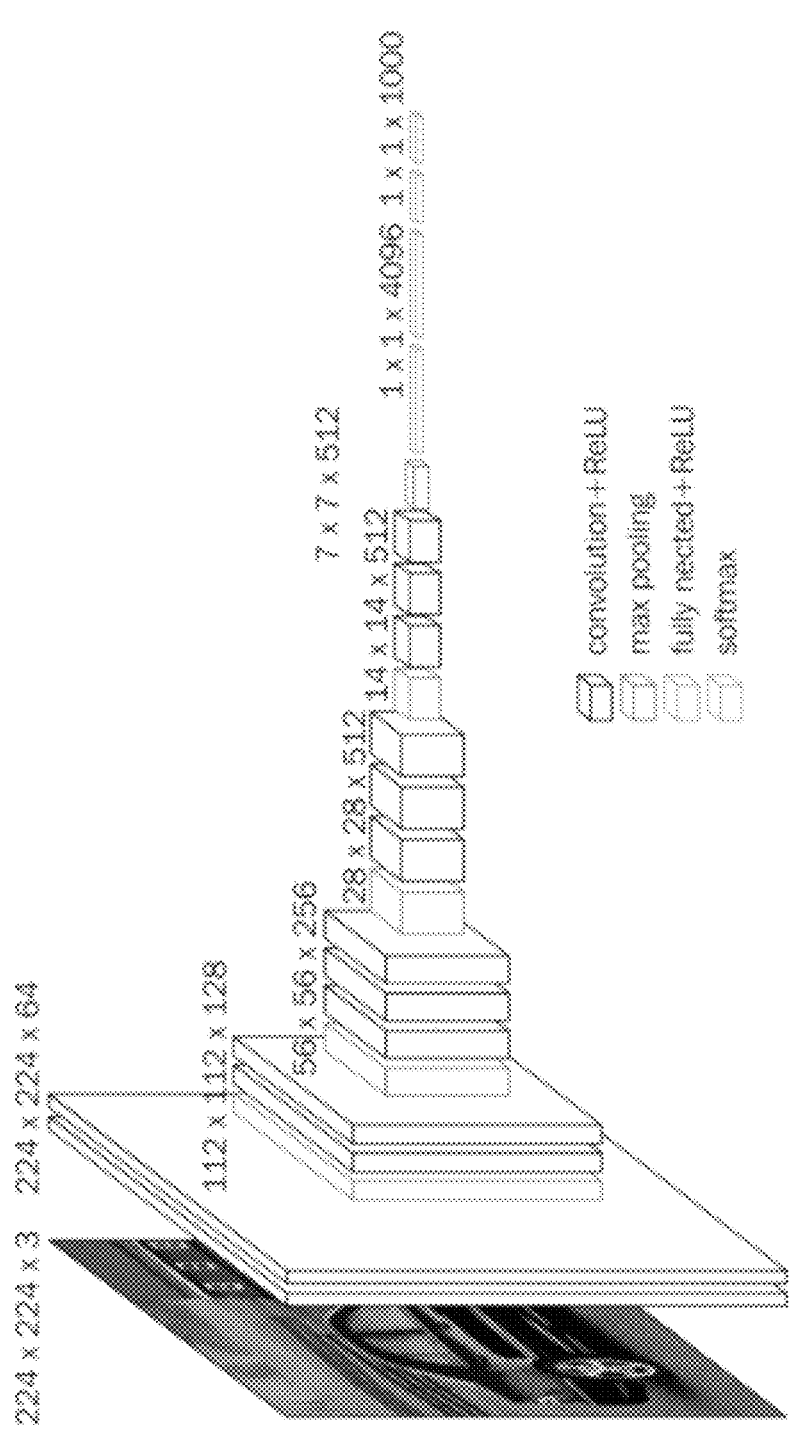
FIG. 5 depicts a VGG network architecture known as VGG16 in one embodiment.

FIG. 5 depicts an embodiment of a VGG network architecture known as VGG16. The model achieves high (e.g., >90%) test accuracy on ImageNet, a dataset of millions images belonging to thousands of classes. VGG16 utilizes multiple 3×3 kernel-sized filters in a series of convolutional layers.

The input in this example is a 224×224 RGB image. The image is passed through a stack of convolutional (conv) layers, each with filters of a 3×3 receptive field. In one configuration, the model also utilizes 1×1 convolution filters to provide a linear transformation of the input channels (followed by a non-linearity layer). The convolution stride is fixed to 1 pixel; the spatial padding is set such that the spatial resolution is preserved after convolution, i.e. the padding is 1-pixel for the 3×3 conv layers. Spatial pooling is carried out by five max-pooling layers, which follow some of the conv layers (not all the conv layers are followed by max-pooling). Max-pooling is performed over a 2×2 pixel window, with stride 2.

Three fully connected (FC) layers follow a stack of convolutional layers (which has a different depth in different configurations of the model). The first two FC layers comprise 4096 channels each. The third performs 1000-way ILSVRC classification and thus comprises one channel per class. The final layer is a Softmax layer.

Hidden layers are equipped with rectification (ReLU) non-linearity. Most VGG16 configurations do not utilize Local Response Normalisation (LRN), as such normalization may not improve the performance but incurs increased memory consumption and computation time.

Figure 6:
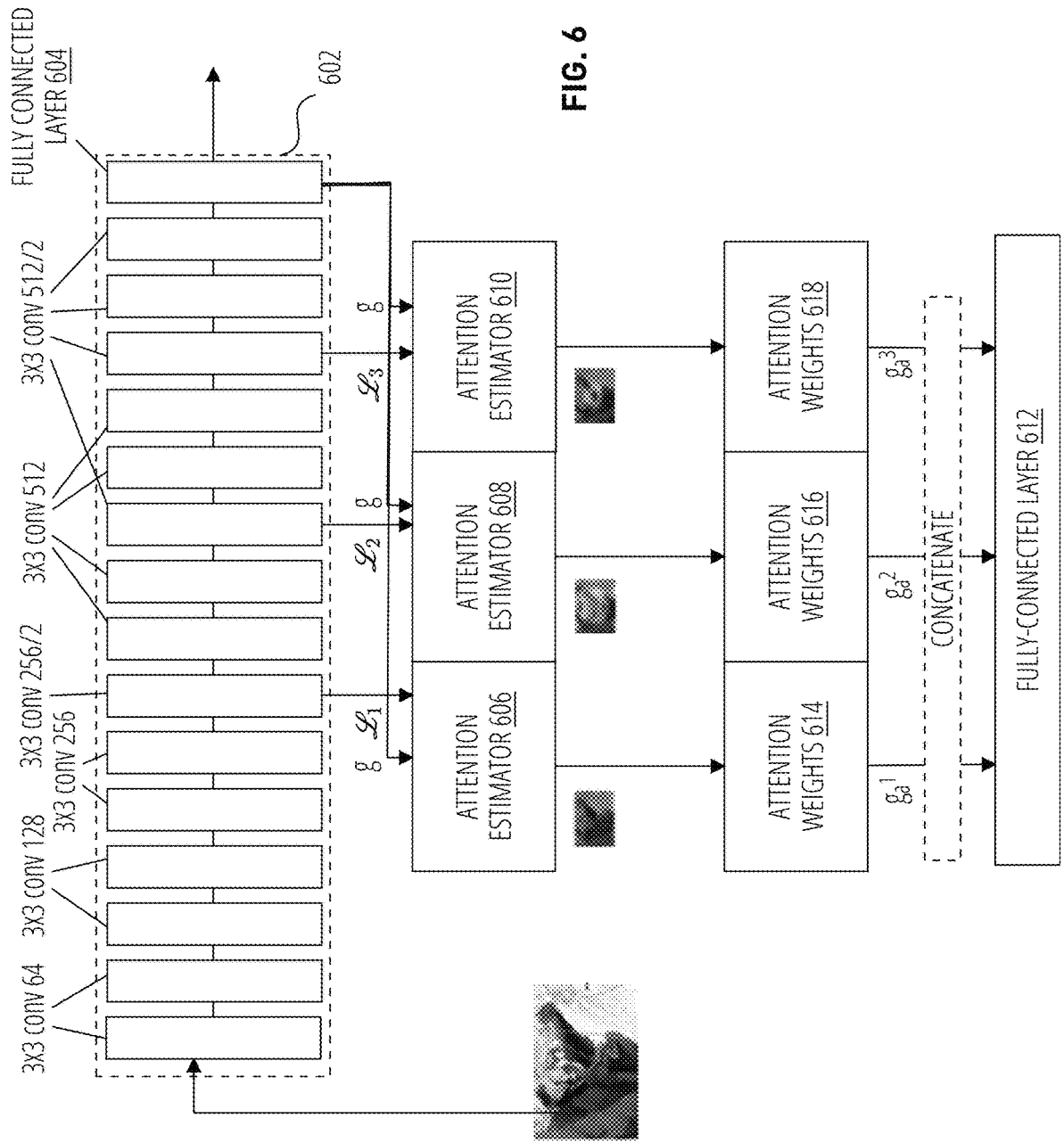
FIG. 6 depicts a convolutional neural network (CNN) comprising an attention mechanism in accordance with one embodiment.

FIG. 6 depicts a convolutional neural network 602 comprising an attention mechanism in accordance with one embodiment. The convolutional neural network 602 generates a feature map for a given image and the feature map is input to a first fully connected layer 604 (e.g., 512 neurons). The convolutional neural network 602 may comprise a VGG16 architecture with the final classifier layer removed and the feature map output from the first fully connected layer 604 redirected to a plurality of attention estimators 606, 608, and 610. The feature map output from the first fully connected layer 604 is herein referred to as a global feature map (g). Also input to the attention estimators are intermediate feature maps for the input image, generated by selected ones of (less than all) of the convolutional layers of the convolutional neural network 602. The attention estimators and subsequent weighting transform the global feature map and intermediate feature maps into different and distinct attention weighted feature maps. The weighted feature maps are concatenated and input to a second fully-connected layer 612.

As noted in the depicted embodiment, the convolutional neural network 602 comprises a VGG16 architecture with the final fully-connected layer removed (alternatively, it may be viewed as having the attention estimators and weighting intervening between the penultimate and final fully connected layers). This model interoperates effectively with attention mechanisms and tends to perform well on image classification tasks.

The convolutional neural network 602 may be trained using supervised learning. Human beings rate (label) training set images for colorfulness, and these are fed to the convolutional neural network 602 during training. An error function determines a degree to which the convolutional neural network 602 output satisfies the labels, and generates a learning feedback signal to adjust weights and possibly other settings of the convolutional neural network 602 to improve its accuracy.

Although this example depicts a VGG16 image classifier, other neural network architectures for image classification may also be utilized. For example, intermediate feature maps may be drawn from convolutional layers of multiple convolutional networks that operate in parallel to classify the input image.

Figure 7:
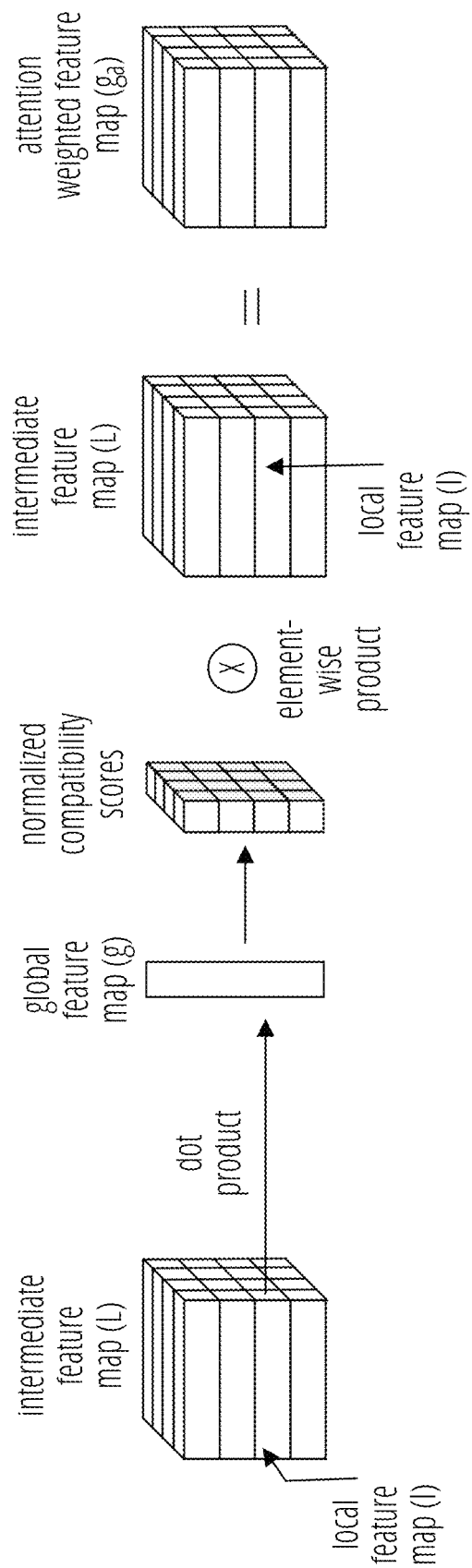
FIG. 7 illustrates an aspect of the subject matter in accordance with one embodiment.

FIG. 7 depicts additional aspects of a CNN in accordance with one embodiment. The attention estimator is to take an intermediate feature map (L) and estimates a compatibility score with the global feature map (g). The intermediate feature map (L) comprises n local feature maps (l). Each local feature map (l) is utilized to generate a compatibility score (c) by dot-product multiplication with the global feature map. The compatibility scores c are normalized (i.e. via Softmax). An element-wise multiplication is performed with the intermediate feature map to generate an attention weighted feature map ($g_a$). In the example of FIG. 6, three attention weighted feature maps ($g_a^1$, $g_a^2$, $g_a^3$) are depicted. These are concatenated and input to the final classifier layer.

The compatibility score is higher when the global feature map (g) and local feature map (l) are similar feature-wise. A higher compatibility score means the local feature map should be more attended to (computing/processing resources focused there) because it shares more critical features (those features that indicate the object or attributes to detect) with the global feature map. Thus, the compatibility score is applied to augment the local feature map such that the global feature map is enhanced and classified accurately.

Figure 8:
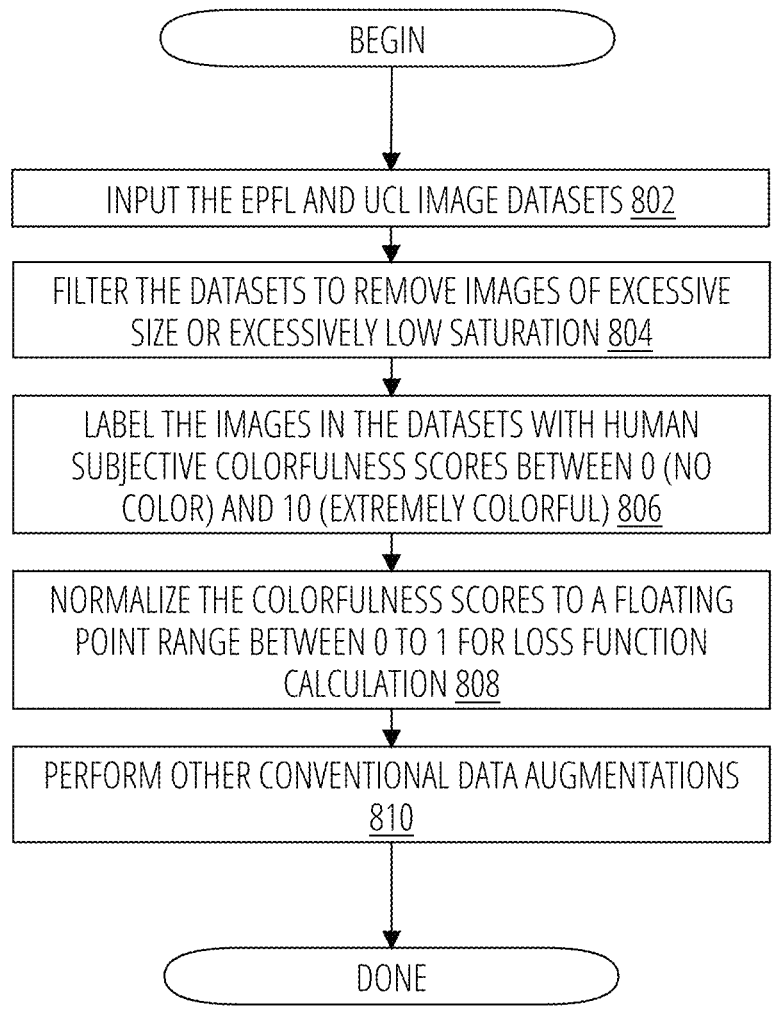
FIG. 8 depicts a data preparation process in one embodiment.

FIG. 8 depicts a data preparation process in one embodiment. In block 802, the EPFL and UCL image datasets are input and at block 804 the datasets are filtered to remove images of excessive size or excessively low saturation. In block 806, the images in the datasets are labeled with human subjective colorfulness scores between 0 (no color) and 10 (extremely colorful). These scores are normalized at block 808 to a floating point range between 0 to 1 for loss function calculation. Other conventional data augmentations may also be performed at block 810.

Figure 9:
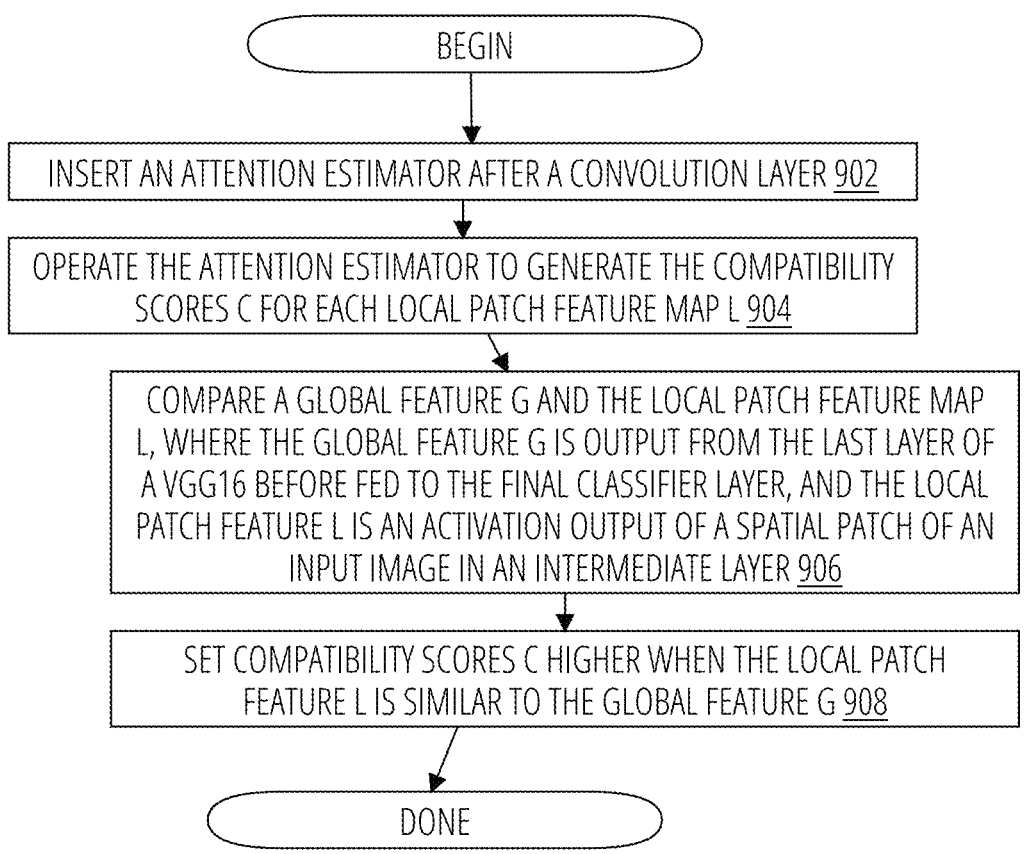
FIG. 9 depicts a colorfulness metric generation process in accordance with one embodiment.

Referring now to the process embodiment depicted in FIG. 9, at block 902, an attention estimator is inserted after a convolution layer (e.g., in parallel with a next convolution layer). In block 904, the attention estimator generates the compatibility scores c for each local patch feature map l. In block 906, a comparison is made between a global feature g and the local patch feature map l, where the global feature g is output from the last layer of a VGG16 before fed to the final classifier layer, and the local patch feature l is an activation output of a spatial patch of an input image in an intermediate layer. In block 908, compatibility scores c are set higher when the local patch feature l is similar to the global feature g.

Figure 10:
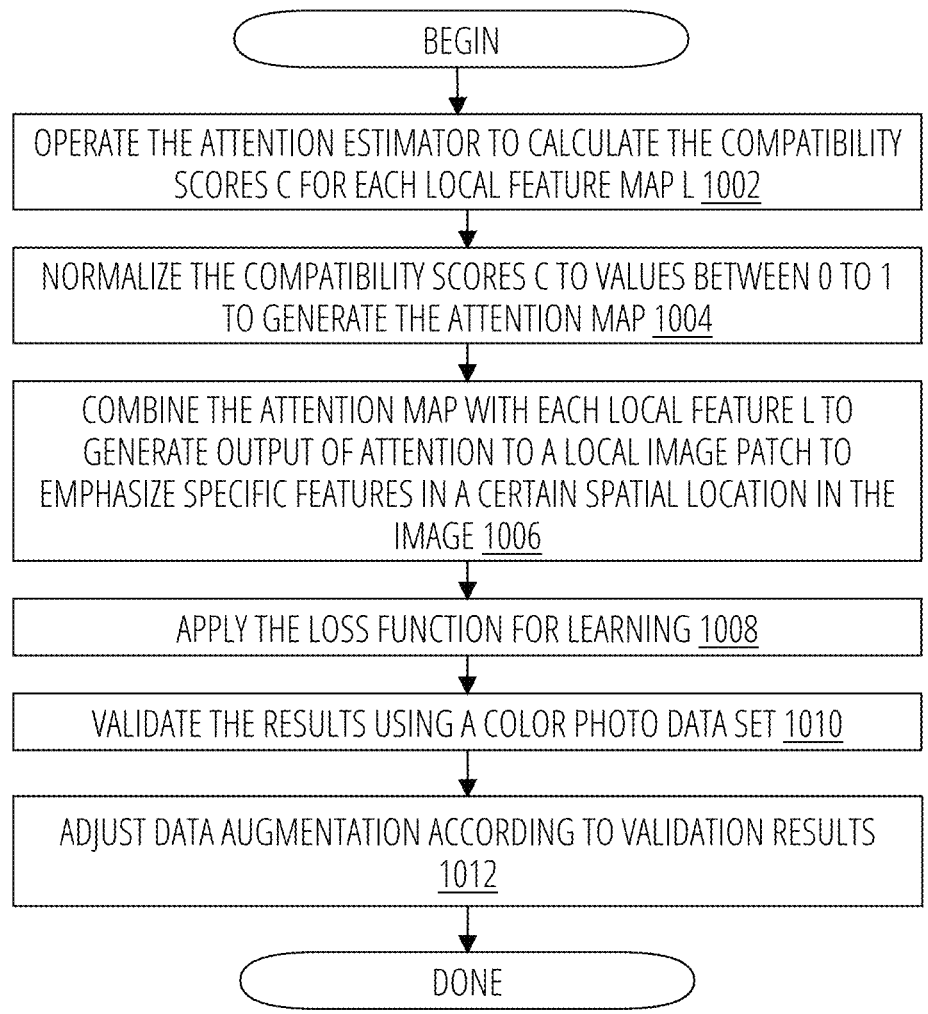
FIG. 10 depicts a colorfulness analysis in accordance with one embodiment.

FIG. 10 depicts a colorfulness analysis in accordance with one embodiment. In block 1002, the attention estimator calculates the compatibility scores c for each local feature map l. In block 1004, the compatibility scores c are normalized to values between 0 to 1 to generate the attention map. In block 1006, the attention map is combined with each local feature/to generate output of attention $g_a$ to a local image patch to emphasize specific features in a certain spatial location in the image. In block 1008, the loss function is applied, for learning. In block 1010, results are validated using a color photo data set and adjusts the data augmentation accordingly (block 1012).

Some embodiments utilize a Mean Absolute Error (MAE, L1-loss) or Mean Square Error (MSE, L2-loss) function as a regression loss, due to the colorfulness score being a continuous score from no color (0) to the most colorful (1).

Structures and methodologies in accordance with the described embodiments result in attention to and improved representation of objects depicted in images with salient color, which are correlated to perceptual subjectivity on the color perception. The attention maps act as a boosting mask to rebalance the perceptual judgment on color perception and measurement of the colorfulness of images.

The systems disclosed herein, or particular components thereof, may in some embodiments be implemented as software comprising instructions executed on one or more programmable device. By way of example, components of the disclosed systems (e.g., the neural network components) may be implemented as or by an application, an app, drivers, or services. In one particular embodiment, one or more components of the system are implemented as services that execute as one or more processes, modules, subroutines, or tasks on a server device, printer, or scanner, so as to provide the described capabilities to one or more client devices over a network. However the system need not necessarily be accessed over a network and could, in some embodiments, be implemented by one or more app or applications on a single device or distributed between a mobile device and a computer, for example.

Figure 11:
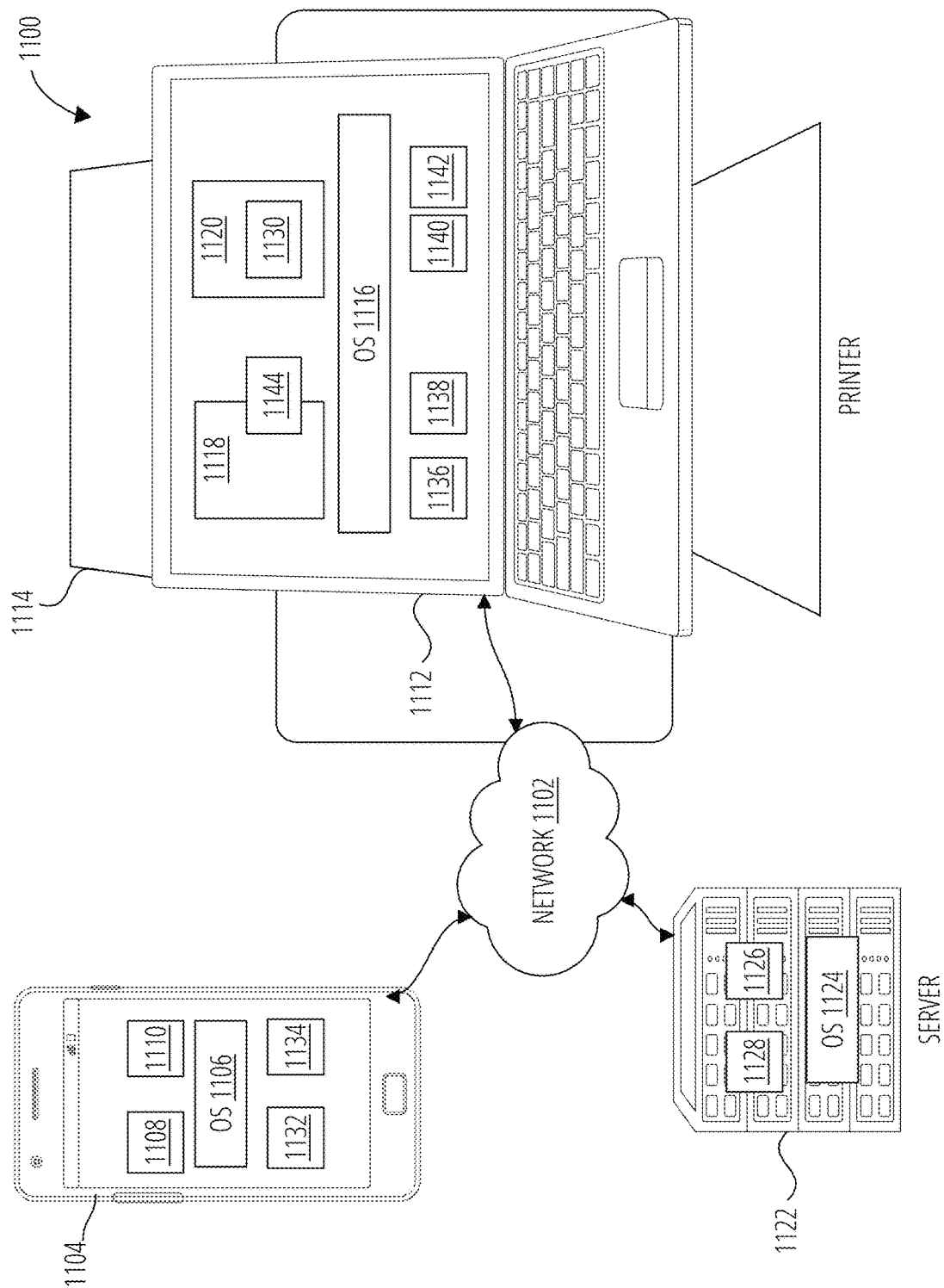
FIG. 11 depicts a client server network configuration 1100 in accordance with one embodiment.

Referring to FIG. 11, a client server network configuration 1100 illustrates various computer hardware devices and software modules coupled by a network 1102 in one embodiment. Each device includes a native operating system, typically pre-installed on its non-volatile RAM, and a variety of software applications or apps for performing various functions.

The mobile programmable device 1104 comprises a native operating system 1106 and various apps (e.g., app 1108 and app 1110). A control system 1112 for a printer 1114 also includes an operating system 1116 that may include one or more library of native routines to run executable software on that device. The control system 1112 also includes various executable applications (e.g., application 1118 and application 1120). The mobile programmable device 1104 and control system 1112 are configured as clients on the network 1102. A server 1122 is also provided and includes an operating system 1124 with native routines specific to providing a service (e.g., service 1126 and service 1128) available to the networked clients in this configuration.

As is well known in the art, an application, an app, or a service may be created by first writing computer code to form a computer program, which typically comprises one or more computer code sections or modules. Computer code may comprise instructions in many forms, including source code, assembly code, object code, executable code, and machine language. Computer programs often implement mathematical functions or algorithms and may implement or utilize one or more application program interfaces.

A compiler is typically used to transform source code into object code and thereafter a linker combines object code files into an executable application, recognized by those skilled in the art as an "executable". The distinct file comprising the executable would then be available for use by the control system 1112, mobile programmable device 1104, and/or server 1122. Any of these devices may employ a loader to place the executable and any associated library in memory for execution. The operating system executes the program by passing control to the loaded program code, creating a task or process. An alternate means of executing an application or app involves the use of an interpreter (e.g., interpreter 1130).

In addition to executing applications ("apps") and services, the operating system is also typically employed to execute drivers to perform common tasks such as connecting to third-party hardware devices (e.g., printers, displays, input devices), storing data, interpreting commands, and extending the capabilities of applications. For example, a driver 1132 or driver 1134 on the mobile programmable device 1104 or control system 1112 (e.g., driver 1136 and driver 1138) might enable wireless headphones to be used for audio output(s) and a camera to be used for video inputs. Any of the devices may read and write data from and to files (e.g, file 1140 or file 1142) and applications or apps may utilize one or more plug-in (e.g., plug-in 1144) to extend their capabilities (e.g., to encode or decode video files).

The network 1102 in the client server network configuration 1100 can be of a type understood by those skilled in the art, including a Local Area Network (LAN), Wide Area Network (WAN), Transmission Communication Protocol/Internet Protocol (TCP/IP) network, and so forth. These protocols used by the network 1102 dictate the mechanisms by which data is exchanged between devices.

Figure 12:
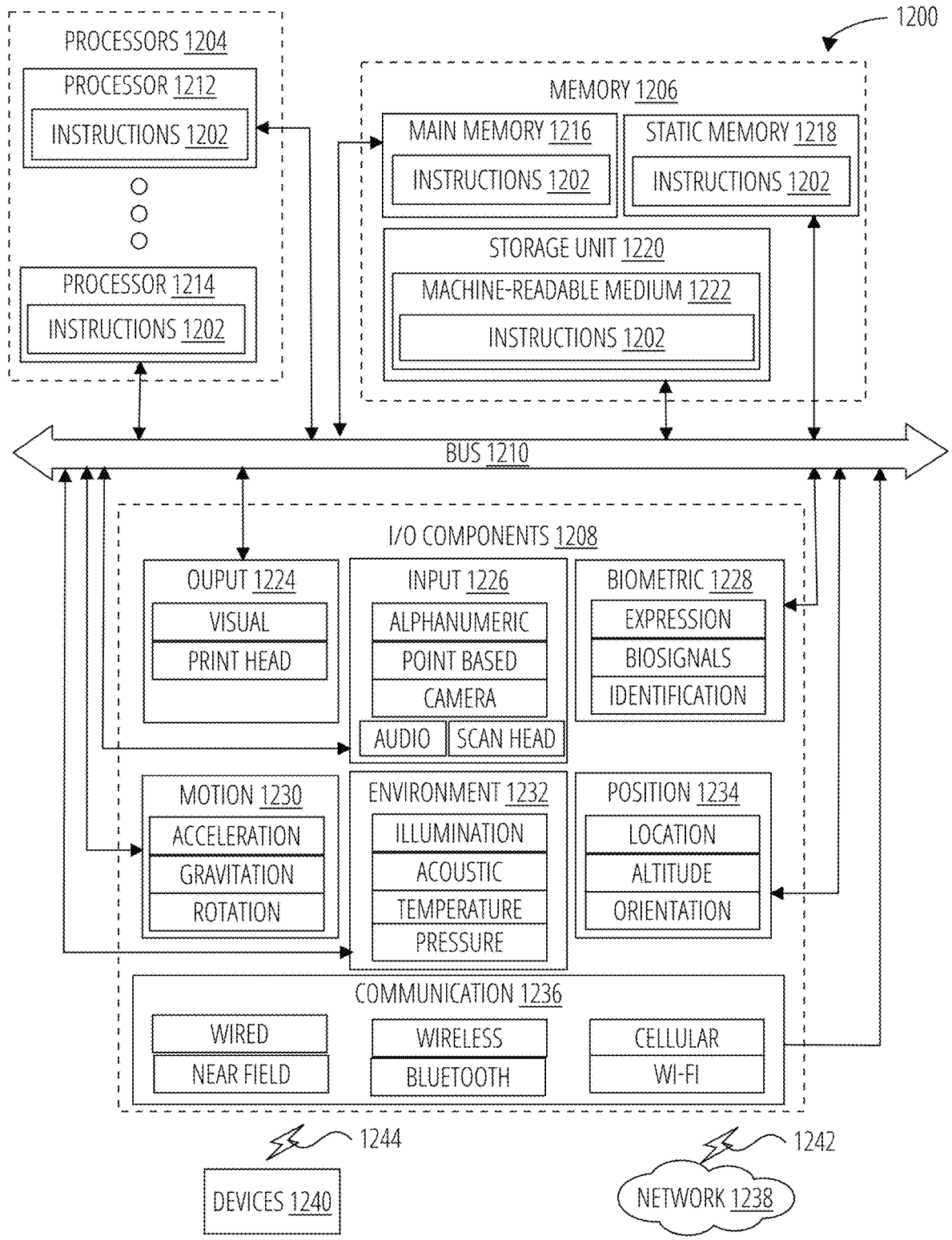
FIG. 12 depicts a machine 1200 within which a set of instructions may be executed for causing the machine to perform any one or more of the methodologies discussed herein, according to an example embodiment.

FIG. 12 depicts a diagrammatic representation of a machine 1200 in the form of a computer system within which logic may be implemented to cause the machine to perform any one or more of the functions or methods disclosed herein, according to an example embodiment.

Specifically, FIG. 12 depicts a machine 1200 comprising instructions 1202 (e.g., a program, an application, an applet, an app, or other executable code) for causing the machine 1200 to perform any one or more of the functions or methods discussed herein. For example the instructions 1202 may cause the machine 1200 to carry out embodiments of the processes depicted in FIG. 8, FIG. 9, and/or FIG. 10. The instructions 1202 configure a general, non-programmed machine into a particular machine 1200 programmed to carry out said functions and/or methods.

In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1202, sequentially or otherwise, that specify actions to be taken by the machine 1200. Further, while only a single machine 1200 is depicted, the term "machine" shall also be taken to include a collection of machines that individually or jointly execute the instructions 1202 to perform any one or more of the methodologies or subsets thereof discussed herein.

The machine 1200 may include processors 1204, memory 1206, and I/O components 1208, which may be configured to communicate with each other such as via one or more bus 1210. In an example embodiment, the processors 1204 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, one or more processor (e.g., processor 1212 and processor 1214) to execute the instructions 1202. The term "processor" is intended to include multi-core processors that may comprise two or more independent processors (sometimes referred to as "cores") that may execute instructions contemporaneously. Although FIG. 12 depicts multiple processors 1204, the machine 1200 may include a single processor with a single core, a single processor with multiple cores (e.g., a multi-core processor), multiple processors with a single core, multiple processors with multiples cores, or any combination thereof.

The memory 1206 may include one or more of a main memory 1216, a static memory 1218, and a storage unit 1220, each accessible to the processors 1204 such as via the bus 1210. The main memory 1216, the static memory 1218, and storage unit 1220 may be utilized, individually or in combination, to store the instructions 1202 embodying any one or more of the functionality described herein. The instructions 1202 may reside, completely or partially, within the main memory 1216, within the static memory 1218, within a machine-readable medium 1222 within the storage unit 1220, within at least one of the processors 1204 (e.g., within the processor's cache memory), or any suitable combination thereof, during execution thereof by the machine 1200.

The I/O components 1208 may include a wide variety of components to receive input, provide output, produce output, transmit information, exchange information, capture measurements, and so on. The specific I/O components 1208 that are included in a particular machine will depend on the type of machine. For example, portable machines such as mobile phones will likely include a touch input device or other such input mechanisms, while a headless server machine will likely not include such a touch input device. It will be appreciated that the I/O components 1208 may include many other components that are not shown in FIG. 12. The I/O components 1208 are grouped according to functionality merely for simplifying the following discussion and the grouping is in no way limiting. In various example embodiments, the I/O components 1208 may include output components 1224 and input components 1226. The output components 1224 may include visual components (e.g., a display such as a plasma display panel (PDP), a light emitting diode (LED) display, a liquid crystal display (LCD), a projector, or a cathode ray tube (CRT)), acoustic components (e.g., speakers), print heads (e.g., black and white or color 3D printing, etc.), and so forth. The input components 1226 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and a scan sensor (i.e., scan head) and/or one or more cameras for capturing/reproducing images (e.g., from paper copies in the case of a printer) and/or video, and the like.

In further example embodiments, the I/O components 1208 may include biometric components 1228, motion components 1230, environmental components 1232, or position components 1234, among a wide array of possibilities. For example, the biometric components 1228 may include components to detect expressions (e.g., hand expressions, facial expressions, vocal expressions, body gestures, or eye tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. The motion components 1230 may include acceleration sensor components (e.g., accelerometer), gravitation sensor components, rotation sensor components (e.g., gyroscope), and so forth. The environmental components 1232 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1234 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1208 may include communication components 1236 operable to couple the machine 1200 to a network 1238 or devices 1240 via a coupling 1242 and a coupling 1244, respectively. For example, the communication components 1236 may include a network interface component or another suitable device to interface with the network 1238. In further examples, the communication components 1236 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1240 may be another machine or any of a wide variety of peripheral devices (e.g., a peripheral device coupled via a USB).

Moreover, the communication components 1236 may detect identifiers or include components operable to detect identifiers. For example, the communication components 1236 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1236, such as location via Internet Protocol (IP) geolocation, location via Wi-Fi® signal triangulation, location via detecting an NFC beacon signal that may indicate a particular location, and so forth.

The various memories (i.e., memory 1206, main memory 1216, static memory 1218, and/or memory of the processors 1204) and/or storage unit 1220 may store one or more sets of instructions and data structures (e.g., software) embodying or utilized by any one or more of the methodologies or functions described herein. These instructions (e.g., the instructions 1202), when executed by processors 1204, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors and internal or external to computer systems. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media,"

and "device-storage media" specifically exclude carrier waves, modulated data signals, and other such intangible media, at least some of which are covered under the term "signal medium" discussed below.

Some aspects of the described subject matter may in some embodiments be implemented as computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular data structures in memory. The subject matter of this application may be practiced in a variety of system configurations, including hand-held devices, consumer electronics, general-purpose computers, more specialty computing devices, etc. The subject matter may also be practiced in distributed computing environments where tasks are performed by remote-processing devices that are linked through a communications network.

In various example embodiments, one or more portions of the network 1238 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1238 or a portion of the network 1238 may include a wireless or cellular network, and the coupling 1242 may be a Code Division Multiple Access (CDMA) connection, a Global System for Mobile communications (GSM) connection, or another type of cellular or wireless coupling. In this example, the coupling 1242 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1202 and/or data generated by or received and processed by the instructions 1202 may be transmitted or received over the network 1238 using a transmission medium via a network interface device (e.g., a network interface component included in the communication components 1236) and utilizing any one of a number of well-known transfer protocols (e.g., hypertext transfer protocol (HTTP)). Similarly, the instructions 1202 may be transmitted or received using a transmission medium via the coupling 1244 (e.g., a peer-to-peer coupling) to the devices 1240. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1202 for execution by the machine 1200, and/or data generated by execution of the instructions 1202, and/or data to be operated on during execution of the instructions 1202, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

LISTING OF DRAWING ELEMENTS

300 VGG net
302*a* convolution layer
302*b* convolution layer
302*c* convolution layer
302*d* convolution layer
304*a* pooling layer
304*b* pooling layer
306*a* RELU layer
306*b* RELUlayer
306*c* RELUlayer
306*d* RELUlayer
400 convolution layer filtering
402 convolution layer
404 next layer
406 filter
602 convolutional neural network
604 fully connected layer
606 attention estimator
608 attention estimator
610 attention estimator
612 fully-connected layer
614 attention weights
616 attention weights
618 attention weights
802 block
804 block
806 block
808 block
810 block
902 block
904 block
906 block
908 block
1002 block
1004 block
1006 block
1008 block
1010 block
1012 block
1100 client server network configuration
1102 network
1104 mobile programmable device
1106 operating system
1108 app
1110 app
1112 control system
1114 printer
1116 operating system
1118 application
1120 application
1122 server
1124 operating system
1126 service
1128 service
1130 interpreter
1132 driver
1134 driver
1136 driver
1138 driver 1140 file
1142 file
1144 plug-in
1200 machine
1202 instructions
1204 processors
1206 memory
1208 I/O components
1210 bus
1212 processor
1214 processor
1216 main memory
1218 static memory
1220 storage unit
1222 machine-readable medium
1224 output components
1226 input components
1228 biometric components
1230 motion components
1232 environmental components
1234 position components
1236 communication components
1238 network
1240 devices
1242 coupling
1244 coupling Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Having thus described illustrative embodiments in detail, it will be apparent that modifications and variations are possible without departing from the scope of the invention as claimed. The scope of inventive subject matter is not limited to the depicted embodiments but is rather set forth in the following Claims.

What is claimed is:

1. A system comprising:
   at least one data processor;
   a memory comprising instruction that, when applied to the at least one data processor, configure the system to implement a neural network comprising:
   a plurality of convolutional hidden layers;
   a first fully-connected layer receiving outputs of a final one of the convolutional hidden layers;
   a plurality of attention estimators each coupled to receive an output of a corresponding different one of the plurality of the convolutional hidden layers;
   a plurality of weight maps each configured to be applied to an output of a corresponding different one of the attention estimators; and
   a second fully-connected layer coupled to receive results of applying each of the weight map.

2. The system of claim 1, each of the attention estimators configured to receive an intermediate feature map from a corresponding different one of the plurality of the convolutional hidden layers.

3. The system of claim 2, each of the attention estimators further configured to receive a global feature map from the first fully-connected layer.

4. The system of claim 1, the neural network comprising a VGG neural network comprising the plurality of the convolutional hidden layers.

5. The system of claim 4, wherein the VGG neural network is a VGG16 neural network.

6. The system of claim 4, wherein two or more of the convolutional hidden layers separate the corresponding different ones of the plurality of the convolutional hidden layers that output the intermediate feature maps to the plurality of the attention estimators.

7. The system of claim 1, the neural network further configured such that outputs of the first fully-connected layer are input to the plurality of the attention estimators instead of to a final fully-connected layer.

8. The system of claim 1, the neural network further configured such that an output of the second fully-connected layer is configured as an input to a loss function to update configuration of the convolutional hidden layers.

9. The system of claim 1, the neural network further configured such that an output of the second fully-connected layer is configured as a control for image colorfulness augmentation logic.

10. A method comprising:
    generating a plurality of attention maps for an image from outputs of a corresponding different one of a plurality of convolutional hidden layers of a neural network;
    generating a plurality of weighted attention maps from the attention maps;
    applying the weighted attention maps to a first fully-connected neural network layer to generate a colorfulness metric; and
    applying the colorfulness metric to augment human-perceived colorfulness of the image.

11. The method of claim 10, each of the attention maps generated from a different intermediate feature map output from a different one of the convolutional hidden layers.

12. The method of claim 11, wherein two or more of the convolutional hidden layers separate the different one of the convolutional hidden layers that output the intermediate feature maps used to generate the attention maps.

13. The method of claim 11, each of the attention maps further generated from a global feature map output from a second fully-connected neural network layer.

14. The method of claim 13, wherein the convolutional hidden layers are part of a VGG neural network and the second fully-connected neural network layer is a final layer of the VGG neural network.

15. The method of claim 14, wherein the VGG neural network is a VGG16 neural network.

16. An image reproduction device, comprising:
    one or more processors;
    an image capture sensor; and
    a memory comprising instructions that, when executed by the one or more processors, configure the image reproduction device to:
    receive a representation of an image generated by the image capture sensor;
    generate a plurality of attention maps for the representation of the image from (a) a plurality of intermediate feature maps each generated by a corresponding different one of a plurality of convolutional hidden layers of a neural network, and (b) a global feature map for the image;
    combine the attention maps to generate a colorfulness metric; and
    applying the colorfulness metric to augment human-perceived colorfulness of the representation of the image.

17. The image reproduction device of claim 16, wherein combining the attention maps comprises concatenating weighted versions of the attention maps.

18. The image reproduction device of claim 17, wherein the weighted versions of the attention maps are generated by applying different weight maps to each of the attention maps.

19. The image reproduction device of claim 16, wherein the neural network is a VGG neural network.

20. The image reproduction device of claim 19, wherein the global feature map is generated by a final fully-connected layer of the VGG neural network.

* * * * *